United States Patent [19]

Yonescu

[11] 4,151,452
[45] Apr. 24, 1979

[54] SYNCHRO DRIVE

[75] Inventor: William E. Yonescu, Ronkonkoma, N.Y.

[73] Assignee: United Technologies Corporation, Hartford, Conn.

[21] Appl. No.: 811,199

[22] Filed: Jun. 29, 1977

[51] Int. Cl.² .............................................. G05B 19/30
[52] U.S. Cl. .................................... 318/605; 318/654; 340/147 SY
[58] Field of Search ............... 318/605, 654, 655, 573; 340/147 SY

[56] References Cited

U.S. PATENT DOCUMENTS

| 3,662,242 | 5/1972 | Wacker et al. | 318/605 X |
| 3,720,866 | 3/1973 | Avellar et al. | 318/654 |
| 3,829,752 | 8/1974 | Martines | 318/654 |
| 3,870,938 | 3/1975 | Tooze et al. | 318/605 |

Primary Examiner—B. Dobeck
Attorney, Agent, or Firm—Eisenman, Allsopp & Strack

[57] ABSTRACT

An arrangement for controlling a plurality of synchro receivers from a single command position. The system requires very little power relative to the torque produced in the controlled synchros. The desired synchro movement is achieved by selective interconnection of the stator terminals at appropriate times to effect desired rotation of the rotor.

9 Claims, 6 Drawing Figures

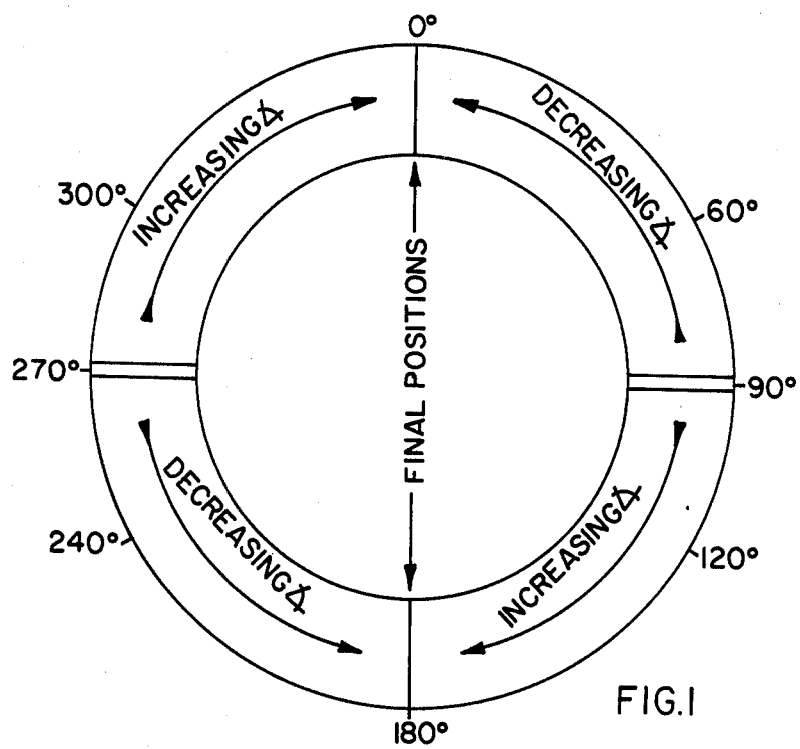
FIG.1
| STATOR CONNECTION | SHAFT WILL ROTATE TO |
|---|---|
| INITIAL POSITION | 0° |
| CONNECT S2 TO S3 | 60° |
| CONNECT S1 TO S2 | 120° |
| CONNECT S1 TO S3 | 180° |
| CONNECT S2 TO S3 | 240° |
| CONNECT S1 TO S2 | 300° |
| CONNECT S1 TO S3 | 360°(0°) |
| CONNECT S2 TO S3 | 60° |
| CONNECT S1 TO S2 | 120° |
| CONNECT S1 TO S3 | 180° |
FIG.2
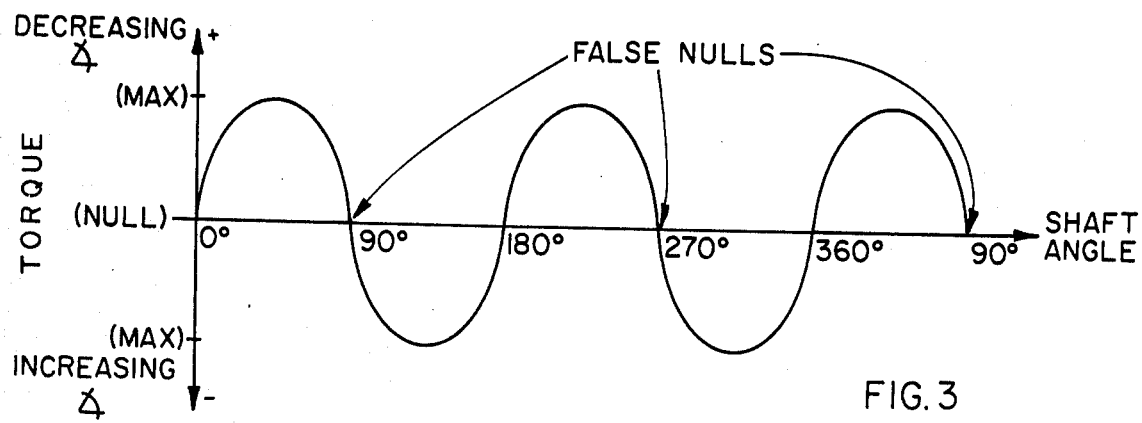
FIG.3

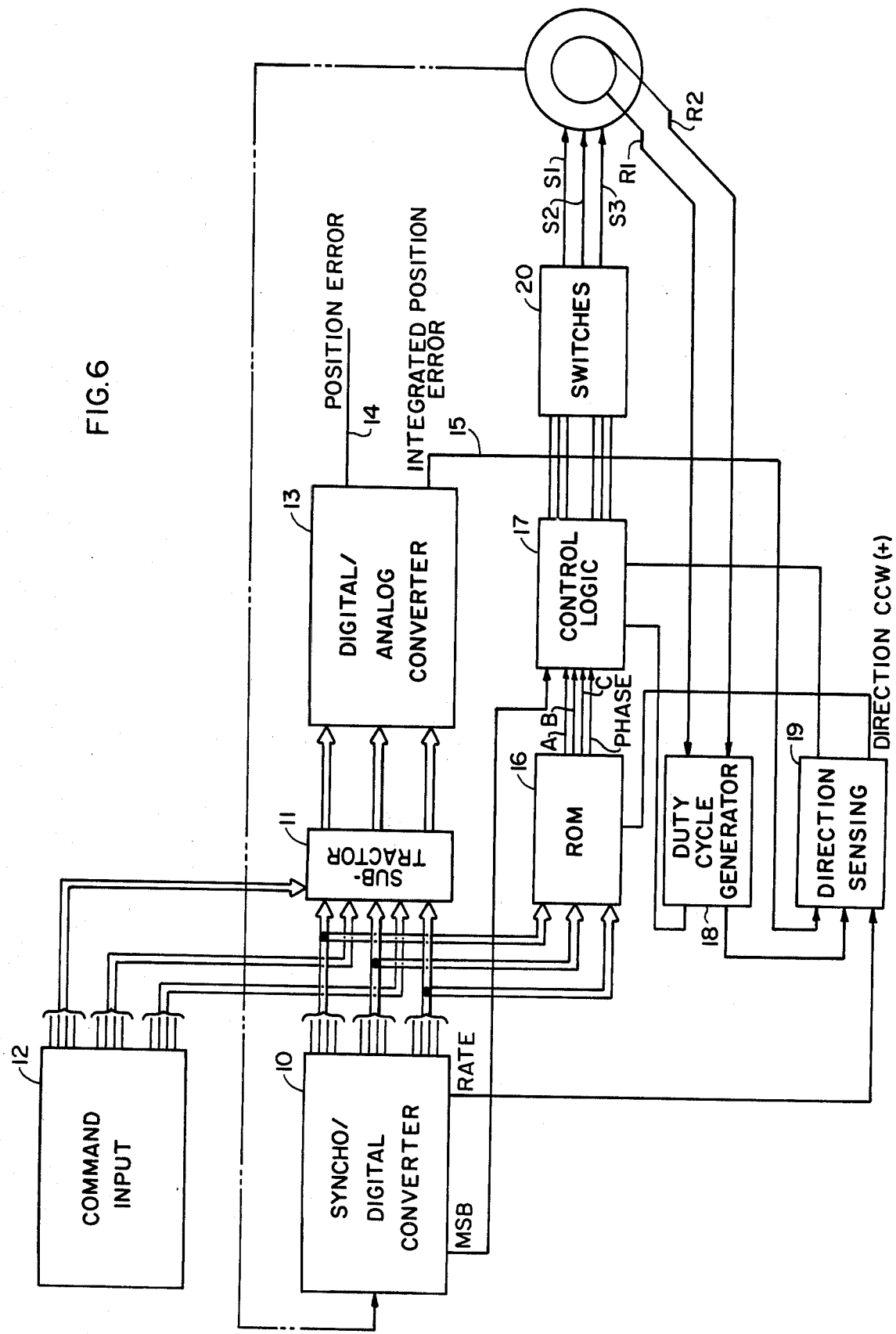

SYNCHRO DRIVE

BACKGROUND OF THE INVENTION

1. Field of the Invention

This invention relates to synchro systems and more particularly to circuitry for driving a plurality of synchros with high acceleration, little power dissipation, and dynamic characteristics that are independent of the number of units driven.

2. Description of the Prior Art

As well known, the synchro is in essence a small AC machine used for the transmission of angular position data. Each unit may comprise a stator carrying three similar windings distributed in slots having axes displaced from one another by 120 degrees, and a rotor with two salient poles and a single winding. The three stator windings may be connected together in either wye or delta. Typically, a transmitting synchro will be connected to a receiver or follower by interconnecting the stator and rotor windings. AC power is applied to the rotor windings and the rotor of the transmitting synchro is commanded to a particular position either manually or otherwise. This effects the generation of current in each of the stator windings of the transmitting synchro and this current flow in the interconnected stator windings of the receiver forces the rotor of the receiver to assume a position substantially identical to the position commanded of the transmitting synchro.

The present invention is concerned with the means for controlling a plurality of synchro receivers from a single command position. In the past, this has been done electronically and it has also been done mechanically. Difficulties arise when one is interested in driving a plurality of receivers, because considerable power or torque is needed in order to effect the desired response.

It is known that in order to "zero" a synchro one shorts out a pair of stator windings and the rotor will then move to either the electrical zero or electrical 180 degree position. Identification of the particular position is a simple matter and the unit is then calibrated to function from this established point. Considerable torque is generated in the rotor when such a shorted condition is imposed; however, to date, little use has been made of this fact other than to initially position such units.

SUMMARY OF THE INVENTION

With a recognition that the selective shorting of particular stator windings to one another, results in the forced positioning of the rotor, a system has been developed to drive synchros in any desired direction under controlled torque conditions. The system selectively monitors the position of a synchro or synchros, compares the position with a desired or commanded position, and thereafter selectively shorts the stator windings for controlled periods of time in order to drive the rotor to the commanded position.

An object of the invention is to produce an improved synchro drive system.

Another object of the invention is to provide a synchro drive system effective to drive a plurality of synchros simultaneously.

Yet another object of the invention lies in the provision of a small and light weight method for driving synchros, with a minimum of power.

Another object of the invention is to provide a synchro drive system that may be developed with solid state components and is not subject to short circuit failure.

Another object of the invention is to provide a synchro drive system wherein the power supplied to the synchro drive unit is small relative to the torque produced in the controlled synchros.

Still another object of the invention is to provide a synchro drive system having dynamic characteristics that are substantially independent of the number of units on the line and that is capable of high torque and acceleration.

In accordance with a particular embodiment of the invention, a synchro drive system is provided which comprises a synchro unit, a signal commanding the position of said unit, means for comparing the commanded position with the actual position of the unit, and switching circuitry for selectively shorting the stator windings of the synchro under the control of the position error, in order to effect rotation of the rotor to the commanded position.

A complete understanding and appreciation of the invention will be available from the following discussion which is made in conjunction with the drawings.

BRIEF DESCRIPTION OF THE DRAWINGS

FIG. 1 is a schematic illustration showing the direction of shaft rotation and final positioning when a typical pair of stator windings are connected together, for various rotor angles prior to this connection;

FIG. 2 is a table indicating the proper stator connections in order to effect a stepping type of continuous rotation;

FIG. 3 is a plot of torque as a function of rotor angle when a pair of stators are connected together;

FIG. 6 is a block schematic showing the circuitry required in order to carry out the invention.

DESCRIPTION OF A PREFERRED EMBODIMENT

Figure 4:
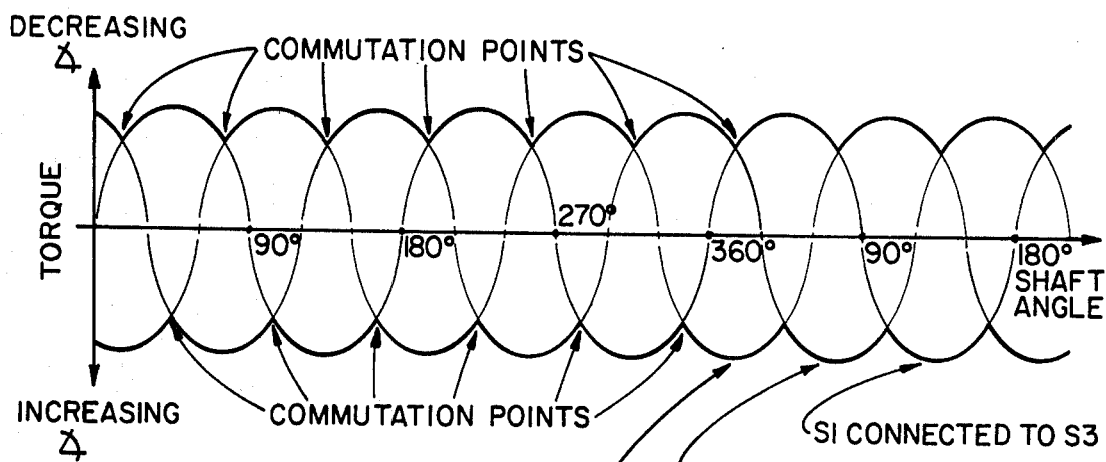
FIG. 4 is a plot of torque versus shaft angle for all three possible connections between pairs of stator windings.

Throughout the following description, the conventional notations in the field of synchros and servomechanisms will be employed. Thus, the three stator windings are considered to have terminals marked S1, S2, and S3. The two rotor terminals are designated R1 and R2. The designations "clockwise" and "counter clockwise" apply to the servo units viewed from the shaft end.

As noted above, a synchro will rotate to a fixed position when its rotor is energized and any two of the three stator leads are connected together. This is true whether the stator is connected in wye or delta. More precisely, when S1 is connected to S3 the synchro shaft will assume a position of either zero degrees or 180 degrees; when S2 is connected to S3 the synchro shaft will assume either a 60 degree position or a 240 degree position; and when S1 is connected to S2 the synchro shaft will assume either a 120 degree position or a 300 degree position. The particular direction of rotation in order to achieve the above described shaft positions, depends upon the position of the rotor prior to the connection of the two stators.

FIG. 1 shows the direction of shaft rotation and final position after S1 and S3 are connected together, for various initial rotor angles. The final positions of either zero degrees or 180 degrees are shown at the top and bottom of the Figure. If the original rotor position is between zero and 90 degrees i.e. in the first quadrant of this illustration, the rotation will be counter clockwise in order to decrease the shaft angle until zero degrees is reached. If the rotor position is between 90 degrees and 180 degrees i.e. in the second quadrant, the rotation will be in a clockwise direction in order to increase the shaft angle until 180 degrees is reached. If the rotor position is between 180 degrees and 270 degrees i.e. in the third quadrant, the rotation will be in a counter clockwise direction in order to decrease the shaft angle until 180 degrees is reached. Finally, if the rotor position is between 270 degrees and 360 degrees i.e. in the fourth quadrant, the rotation will be in a clockwise direction to increase the shaft angle until 360 degrees is reached. Of course, it will be recognized that the 360 degree point is identical with the zero degree position.

A similar analysis of the direction of rotation required for a rotor to move in the event of connection of S2 and S3 or S1 and S2, may be developed. Indeed, with suitable consideration for the necessary angular displacement of the various windings, these diagrams would be similar to that shown in FIG. 1, with the exception of displacement by 60 or 120 degrees depending upon the particular terminals that are connected together.

With the above information in mind, it will be seen that by connecting two of the three stators together in the correct sequence, a stepping type of continuous rotation is achieved. The table in FIG. 2 sets forth the correct sequence of connection for increasing angle rotation. One may reverse the sequence set forth in this table in order to effect a rotation in the direction of decreasing angle.

When the stator terminals are connected together, a high torque is generated and there is relatively high acceleration of the rotor until it reaches the null point for the particular stator connection. In order to reduce this torque, it is advantageous to limit the period of time during which the stator terminals are interconnected. In actuality this is achieved by limiting the interconnection to only a fraction of each cycle of the rotor excitation. Under these conditions, the torque is a function of the duty cycle that the stators are connected together. It is also a function of the actual shaft position.

FIG. 3 is a plot of torque versus shaft angle when stator terminals S1 and S3 are interconnected. While the wave shape is basically sinusoidal in form, this is a function of the design and windings of each synchro unit. As illustrated, increasing the shaft angle from zero to 90 degrees produces an opposing torque shown above the axis. At approximately 90 degrees, a false null (no net torque) is achieved. Thereafter, continuing this rotation in the direction of increasing angle from 90 degrees to 180 degrees produces an aiding torque below the axis. The changes in magnitude and direction of torque repeat cyclically as one continues to increase the shaft angle.

FIG. 4 is a composite plot of the torque created by all three stators if they are sequentially commutated, in pairs, at the torque crossover points. Such operation is preferable in order to achieve a substantially continuous torque in either direction.

Figure 5:
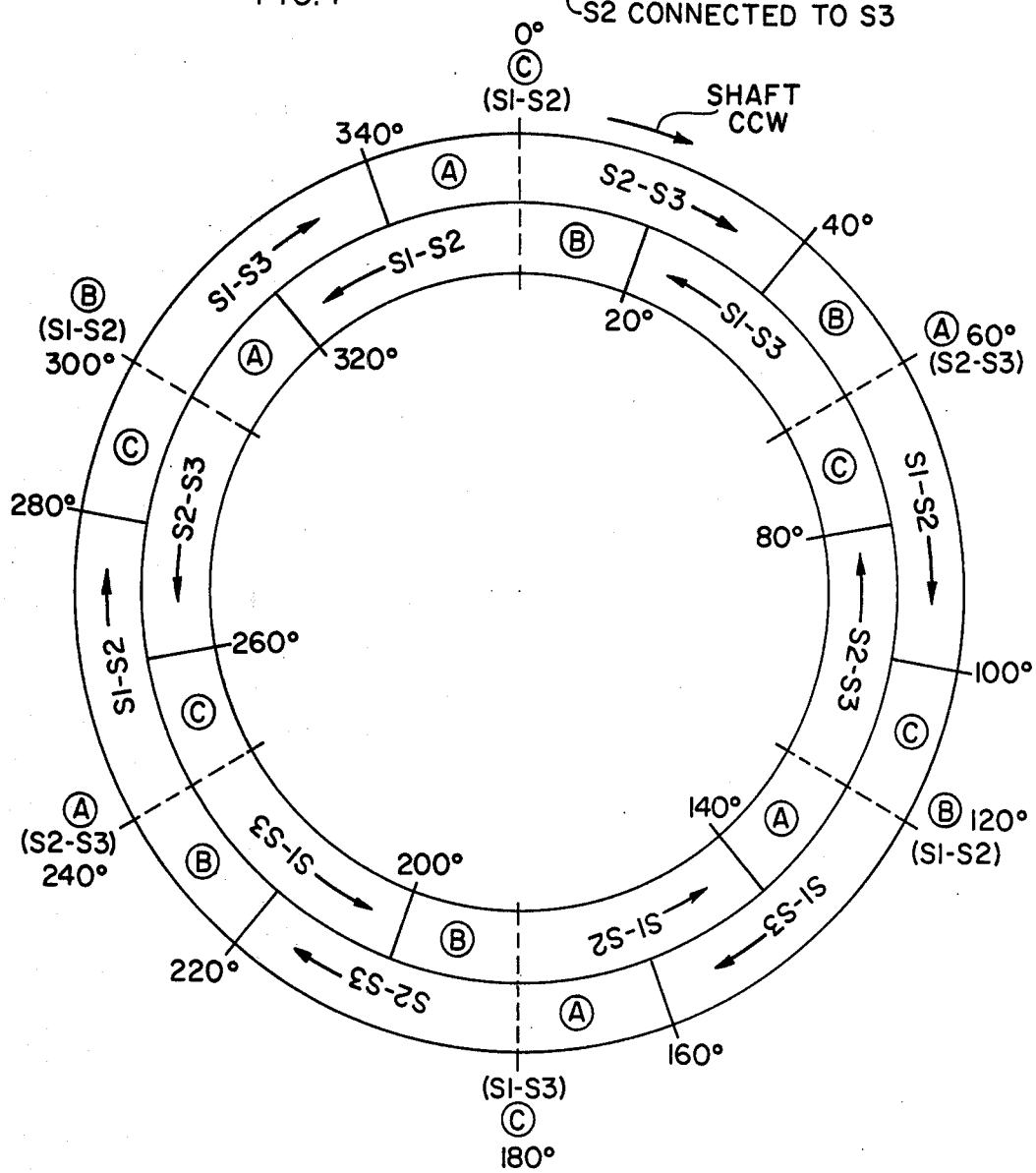
FIG. 5 is a schematic illustration showing the appropriate commutation of stator connections to effect controlled rotor rotation.

The schematic drawing of FIG. 5 has been prepared in order to illustrate the necessary functioning of commutation logic in order to drive a synchro unit from position to position in accordance with commands. The diagram has two annular rings of differing radius. The two rings bear notations indicating which stator windings are connected together in order to effect the rotation shown by the accompanying arrows.

If it is assumed that the rotor is initially at zero degrees and it is desired that it be rotated to 95 degrees, the chart indicates the rotation in the direction of increasing requires first the interconnection of terminals S2, S3 . This should be maintained until a 40 degree position is achieved, at which point there should be a commutation and S1, S2 should be connected together. This will then permit the rotor to continue until it reaches the 95 degree point. Consideration should be given again to FIG. 4 in order to recognize why the 40 degree position is an optimum commutating point. The three torque wave forms in FIG. 4 are typical of a unit that is not precisely sinusoidal and in which the commutating points appear at 40 degrees, 100 degrees, 160 degrees, 220 degrees, 280 degrees, and 340 degrees. It is at these commutating points that the torque developed as a result of the connection of two pairs of terminals is equal. For example, at 40 degrees in the direction of increasing angle, the torque created by the connection of terminals S1 to S2 and S2 to S3 is equal. If these connections were not commutated at 40 degrees, etc., there would be step change in the torque which might lead to instability in the system. Of course, since the synchro windings themselves determine the shape of the torque curves, some variation must be expected and acted upon by a particular system designer. The corresponding commutation points for decreasing angle appear at 320 degrees, 260 degrees, 200 degrees, 140 degrees, 80 degrees, and 20 degrees.

FIG. 6 is a block diagram showing the system of this invention using the techniques described above. Basically, the synchro is positioned in accordance with the following method: First, the actual shaft position is sensed by synchro-digital converter 10; the difference between the commutated position and actual position is used to one, determine the direction in which the synchro must rotate and two, establish the duty cycle or time during which appropriate stators are connected; commutation logic is employed to determine which pair of stators should be connected in order to effect the desired rotation; and as the shaft position reaches the commanded position, the sensed decreasing error will effect a reduction in the duty cycle until a null is reached at the commanded position.

In particular, input data is applied in digital form setting forth the specific desired position of the synchro unit. The actual position is fed back from the unit itself to a synchro-digital converter 10. The output of this unit, in digital form, is applied to a subtractor 11 in conjunction with the corresponding digital information from command input 12. The output of subtractor 11 is then applied to a digital to analogue converter 13 in order to develop a position error signal on lead 14 and an integrated position error signal on lead 15. The position error is an analogue output having a magnitude proportional to the amount of the error and indicates by polarity, the direction in which the rotor must move in order to achieve the commanded position. This signal is then integrated to form the integrated position error signal. The output of the synchro-digital converter is also applied to a ROM unit 16 where it is converted under the control of the direction signal into information regarding the particular interconnected leads and appears as a polarized signal on leads A, B, C with the phase identified by a fourth independent lead. For identification purposes, attention is redirected to FIG. 5 where it is made clear that the alphabetic designations A, B, C correspond to the interconnections S2-S3, S1-S2, and S1-S3 respectively. These signals are then applied to control logic 17. The rotor signal appearing on Ref 1, Ref 2, is simultaneously applied to a duty cycle generator 18, while the rate information and integrated position error information is applied to a direction sensing circuit 19. The duty cycle generator reacts to the actual position of the rotor relative to the commanded position and establishes the duration of the signals applied at the output of the control logic 17.

Accordingly, the signals appearing at the output of the control logic 17 are used as triggering sources for a plurality of switches 20. These switches may advantageously consist of silicon controlled rectifiers positioned across each of the stator terminals and selectively triggered by the signals on leads A, B, C. In accordance with the desires of a designer, the switches employed for connecting the stator terminals may also comprise triacs or other non-electronic devices. It will be noted that there are six such leads at the output of the control logic. The particular leads selected depend upon the direction in which the rotor is to rotate.

It will be seen that a feedback loop is provided in accordance with which the commanded position in digital form is compared with the actual position in digital form, to create an analogue position error signal; the magnitude of this signal being used to establish a duty cycle of interconnection, and the direction of the error being used to determine how the commutation logic will effect interconnections.

A system has been described for the simple, rapid, and efficient control over a plurality of synchro units. No attempt has been made to impose specific circuit elements for the development of this system. Modifications and details may be included by those skilled in the art. It is intended to embrace any such modifications within the scope of the following claims.

What is claimed is:

1. A synchro drive system comprising a synchro unit having stator windings and an energized rotor, means for generating data indicative of the desired position of said synchro unit, comparison means for comparing the actual position of said synchro unit with said data, switching means for selectively interconnecting the stator windings of said synchro unit, said switching means being controlled by said comparison means to effect interconnections that drive said rotor in a direction to reduce the difference between said actual position and said data.

2. A synchro drive system as defined in claim 1, wherein the period of each said interconnection is controlled in accordance with the magnitude of the difference between said actual position and said data.

3. A synchro drive system as defined in claim 1, wherein each interconnection is selected in accordance with the desired direction of rotation of said synchro unit to reduce the difference between said actual position and said data.

4. A snychro drive system as defined in claim 1, wherein said data is in digital form, including a synchro to digital converter responsive to the rotor position of said synchro unit, to develop a digital representation of said position for comparison with said data.

5. A synchro drive system as defined in claim 4, wherein said comparison means is a subtractor.

6. A synchro drive system as defined in claim 5, including a digital to analogue converter, the output of said subtractor being applied to said digital to analogue converter to produce signals having magnitudes indicative of the magnitude and sense of the difference between said actual position and said data.

7. A synchro drive system as defined in claim 1, wherein said interconnections are effected only between stator windings which generate substantially the same torque on said rotor at the actual position thereof when the interconnection is effected.

8. A synchro drive system for a plurality of synchro units, each having stator and rotor winding, comprising: means for generating digital data representative of the desired position of said synchro units, means for sensing the actual position of each synchro unit and generating digital data representative thereof, switching means for selectively interconnecting the stator windings of each said synchro unit, comparison means responsive to the difference between said desired and actual position data for controlling said switching means to effect interconnections yielding torque to move the rotors of each synchro unit in the direction to reduce said difference, means for controlling the period of said interconnections in accordance with the magnitude of said difference.

9. A synchro drive system comprising a synchro unit having stator windings and an energized rotor, means for generating data indicative of the desired position of said synchro unit, comparison means for comparing the actual position of said synchro unit with said data, switching means for selectively interconnecting the stator windings of said synchro unit, said switching means being controlled by said comparison means to effect interconnections that drive said rotor in a direction to reduce the difference between said actual position and said data, said interconnections to effect increasing angular movement of said rotor being commutated at different selected interconnections substantially at actual rotor positions of 40°, 100°, 160°, 220°, 280°, and 340°.

* * * * *